United States Patent Office 2,816,122
Patented Dec. 10, 1957

2,816,122
METHOD OF RECOVERING THORIUM

Ray W. Fisher, Ames, Iowa, assignor to the United States of America as represented by the United States Atomic Energy Commission No Drawing. Application March 4, 1948, Serial No. 13,089

3 Claims. (Cl. 260—429.1)

This invention relates to a method of recovering thorium from a composition containing it. More specifically it relates to a method of recovering thorium from slag material formed during the reduction of salts of thorium to yield metallic thorium.

When thorium halides are treated at an elevated temperature with a metal selected from the group comprising alkali and alkaline earth metals, thorium is reduced to metallic form and a slag comprising a halide of the alkali or alkaline earth metal is produced. As shown in copending application filed November 14, 1945, Serial No. 628,652, this process is best carried out at a temperature above the melting point of thorium metal. To secure this result the charge is heated sufficiently to start the reaction and the heat formed by the reaction is augmented by the addition of a booster. A suitable booster is iodine. An improvement in this process is disclosed in copending application filed September 6, 1946, Serial No. 695,299 and granted as U. S. Patent No. 2,782,116 on February 19, 1957. According to this latter invention, the process of producing massive thorium metal is made easier by co-reducing a halide of zinc or lead with the thorium halide. By either of these processes a slag is formed that contains mixed halides having a lower melting point than a slag comprising a simple halide, as for example, calcium fluoride.

Slags produced by the processes outlined above may contain various materials including compounds of thorium which have not been reduced to metallic form. Thus a slag produced by co-reducing thorium tetrafluoride and zinc chloride using calcium metal in a ferrous metal container having a lime liner was found to contain calcium, calcium oxide, thorium oxide, iron, zinc fluoride, calcium fluoride, zinc metal, thorium metal and unreduced thorium tetrafluoride.

It is an object of this invention to provide a method of recovering thorium from such a slag.

According to this invention the slag containing thorium is first leached with water to remove soluble salts such as calcium hydroxide. The leachings are discarded and the residue is treated with concentrated hydrochloric acid which dissolves all free thorium metal, thorium hydroxide, iron, calcium oxide and zinc salts. The material that is insoluble in the acid comprises calcium fluoride, thorium fluoride, and thorium oxide.

The acid solution is made 1 to 3 normal in hydrochloric acid and the thorium is precipitated as the oxalate by the addition of oxalic acid. Preferably, a small amount of nitric acid is added to prevent the co-precipitation of ferrous oxalate.

The material insoluble in hydrochloric acid is digested in a water solution of sodium hydroxide by gentle boiling for about four hours. The resulting solution is diluted and filtered and the filtrate is discarded. The residue is treated with hydrochloric acid. Any residue left after this latter treatment is again treated with sodium hydroxide solution and hydrochloric acid as just shown. The combined acid-treated solution is made 1 to 3 normal in hydrochloric acid and the thorium is precipitated by the addition of oxalic acid.

The operation of this invention is illustrated by the following example:

Example 1

Step 1.—A sample of slag weighing one kilogram was prepared for treatment by grinding. The ground sample was then leached with one liter of water. In this treatment heat was produced and hydrogen and acetylene gases were evolved, the resulting solution being then in the form of a thick slurry.

Step 2.—The residue from the water leach, containing about 1220 grams of material on a dry basis, was then treated with 3.3 liters (7.32 pounds) of concentrated hydrochloric acid. The resulting solution was filtered. The acidity of the filtrate was 1–3 normal. Then 10 milliliters of concentrated nitric acid were added. Next 70 grams of oxalic acid (100% excess of the stoichiometric amount) were added and the solution was allowed to stand for 12 hours. About 81 grams of thorium oxalate, equivalent to 46.2 grams of thorium, were produced.

Step 3.—The acid-insoluble residue from step 2, weighing about 230 grams, was mixed with 200 grams of flake sodium hydroxide and suficient water was added to give a volume of about 400 milliliters. The resulting solution was then boiled for four hours, diluted with water to 1 to 2 liters and then filtered. The filtrate was discarded and the residue was treated with 500 milliliters of 6-normal hydrochloric acid.

The insoluble residue was then mixed with about 50 grams of flake sodium hydroxide and water was added to a volume of about 100 milliliters. The resulting solution was boiled for about four hours, diluted to 250–500 milliliters, and filtered. The filtrate was discarded and the residue was treated with 200 milliliters of 6-normal hydrochloric acid.

The two hydrochloric acid solutions were combined and the combined solution was made 1 to 3 normal in hydrochloric acid. About 5 milliliters of concentrated nitric acid were then added followed by 12 grams of oxalic acid which precipitated the thorium as thorium oxalate. This was equivalent to about 8.8 grams of thorium.

The total recovery of thorium from step 2 and step 3 was equivalent to about 55 grams.

The final residue from the second part of step 3 weighed about 37 grams. Thorium contained in it was recovered by dissolution in 60 percent perchloric acid followed by the addition of 12 grams of oxalic acid which precipitated the thorium as thorium oxalate. An additional 8.6 grams of thorium were then recovered. The cost and unavailability of large quantities of perchloric acid make this final treatment unattractive from a commercial point of view.

The thorium oxalate obtained by this process may be converted to thorium tetrafluoride and the latter salt may then be used for the production of thorium metal.

The foregoing illustration and embodiment of this invention are not intended to limit its scope, which is to be limited entirely by the appended claims.

What is claimed is:

1. A process for recovering thorium from a mixture containing metallic thorium, thorium hydroxide, thorium oxide, thorium tetrafluoride and water and acid-soluble impurities, which comprises separating water-soluble impurities from said mixture by water leaching, treating the leached material with concentrated hydrochloric acid to dissolve metallic thorium, thorium hydroxide and acid-soluble impurities, subjecting the acid-treated residue to the action of caustic alkali whereby thorium oxide and thorium tetrafluoride are transformed to acid-soluble compounds, subjecting the caustic-treated material to the action of aqueous hydrochloric acid to dissolve the residual thorium, and precipitating thorium oxalate from the hydrochloric acid solutions thus obtained.

2. A method of recovering thorium comprising leaching a composition containing thorium with water, removing the water solution, treating the residue with hydrochloric acid, separating the solution from the insoluble residue, adjusting its acidity to 1–3 normal, adding oxalic acid, and thereafter separating the thorium oxalate thus precipitated, digesting the residue from the hydrochloric acid treatment with a strong solution of sodium hydroxide at an elevated temperature, removing said solution and treating the insoluble residue with hydrochloric acid, separating the solution from the insoluble residue, adjusting the acidity of the solution to 1–3 normal, adding oxalic acid, and thereafter separating the thorium oxalate thus precipitated.

3. A method of separating thorium from impurities found in a slag containing thorium and said impurities comprising leaching a composition containing thorium with water, removing the water solution, treating the residue with hydrochloric acid, separating the solution from the insoluble residue, adjusting its acidity to 1–3 normal, adding nitric acid, adding oxalic acid, and thereafter separating the thorium oxalate, thus precipitated; digesting the residue from the hydrochloric acid treatment with a strong solution of sodium hydroxide at an elevated temperature, removing said solution and treating the insoluble residue with hydrochloric acid, separating the solution from the insoluble residue, adjusting the acidity of this solution to 1–3 normal, adding nitric acid to oxidize the iron present, adding oxalic acid and thereafter separating the thorium oxalate thus precipitated.

No references cited.